United States Patent Office 3,534,002
Patented Oct. 13, 1970

3,534,002
POLYAMIDES FROM DICARBOXY DERIVATIVES OF HYDRONAPHTHALENES AND PROCESSES FOR THEIR MANUFACTURE
Louis C. Gibbons, Denver, Colo., assignor to Marathon Oil Company, Findlay, Ohio, a corporation of Ohio
No Drawing. Filed Mar. 3, 1967, Ser. No. 625,900
Int. Cl. C08g 20/00
U.S. Cl. 260—78                             11 Claims

ABSTRACT OF THE DISCLOSURE

A process for the production of polyamides of hydronaphthalenes in which at least one ring is saturated from dicarboxynaphthalenes comprising in combination the steps of:
 (a) contacting naphthalene dicarboxylic acid, or the diester thereof, with hydrogen at a pressure of about 500 to about 10,000 p.s.i.g., and at a temperature of from about 0° to about 200° C. in the presence of a reduced nickel catalyst comprising in excess of at least 50% by weight nickel or a noble metal catalyst to form, respectively, 1,2,3,4-tetrahydronaphthalenedicarboxylic acid, or the diester thereof, decahydronaphthalene dicarboxylic acid, or the diester thereof.
 (b) polymerizing said 1,2,3,4-tetrahydronaphthalenedicarboxylic acid or the ester thereof or decahydronaphthalene dicarboxylic acid or the ester thereof with diamines in the presence of a polymerization catalyst to form a polymer containing at least 1 mole percent tetrahydronaphthalene or decahydronaphthalene radicals.

The polyamides of the present invention are useful for a wide variety of purposes, including most of those to which polymeric materials are put, such as the manufacture of molded products, cast products, films, and fibers. In addition to their use in the production of homopolymers by reacting with structurally similar diamines, the diacids of the present invention may also be utilized in a production of co-polymers with such common monomers as adipic acid, terephthalic acid, naphthalenedicarboxylic acid, etc. In addition, homopolymers and co-polymers manufactured from the materials and techniques of the present invention may be utilized in non-chemical admixture or alloy with other polymeric materials.

CROSS REFERENCES TO RELATED APPLICATION

United States patent application 529,220, filed by the present applicants and assigned to the assignee of the present application, deals with processes for the manufacture of compounds which are somewhat related to the polyamides of the present invention, including hydronaphthalenes, particularly tetrahydronaphthalenes and substituted tetrahydronaphthalenes.

BACKGROUND OF THE INVENTION

Field of the invention

The techniques of manufacture of polyamides and the applications of these materials are the subject of widespread interest because of the versatility and desirable properties of this type of polymeric material. The processes and products of the present invention for the first time provide the versatile tetralin structure with its fused aromatic and saturated ring in a polymeric material and the versatile decalin structure with its fused saturated rings.

Description of the prior art

In addition to the wide variety of literature in the general field of polyamides, at least two papers (L. Starr, J. Polymer Sci., Pt. A–1, 4 3041–3046 (1966), and W. A. Kramer and L. A. Joó, Am. Chem. Soc., Div. Petrol. Chem. Symposium, 6, No. 2C, 5–8 (1961) and one patent (British 785,214) have appeared on polyamides from naphthalenedicarboxylic acids. However, so far as we know, no patent or other reference has taught the use of tetralin or decalin derivatives for the production of polyamides.

SUMMARY

According to the present invention, tetrahydronaphthalene dicarboxylic acid and decahydronaphthalenedicarboxylic acid or the diesters thereof formed from such diacids by reaction with monohydric organic compounds, or the diacid chlorides formed from such diacids by reaction with thionyl chloride or other suitable chlorinating agent, are reacted with diamines (that is, organic compounds containing two amino groups) to form polyamide polymeric materials.

The starting materials of the present invention are the isomers of 1,2,3,4 - tetrahydronaphthalene-dicarboxylic acid and decahydronaphthalene-dicarboxylic acid, and their esters and acid chlorides. Thus, in the case of tetrahydronaphthalenes the starting materials may have both functional groups on the saturated nucleus, both on the unsaturated nucleus, or one on the saturated and one on the unsaturated nucleus. In the case of decahydronaphthalene-dicarboxylic acid, the starting materials may have both functional groups on the same saturated ring or one functional group on each saturated ring. Especially preferred, of the isomers is 1,2,3,4-tetrahydro-2,6-dicarboxylic acid, decahydro - 2,6 - naphthalene-dicarboxylic acid, their diesters and diacid chlorides.

1,2,3,4-tetrahydronaphthalene dicarboxylic acids (THN acids) are preferably prepared according to the methods of U.S. application 529,220 mentioned above. Thus, naphthalene or substituted naphthalene is reacted with hydrogen at a temperature of from about 0 to 200° C., preferably 75 to about 175° C., and most preferably 130 to about 160° C., at pressures of from about 500 to about 10,000 p.s.i.g., preferably from about 1,000 to about 3,000, and most preferably from about 1,200 to about 1,500 p.s.i.g., in the presence of a catalyst comprising at least 50%, and preferably at least 60% nickel in a reduced state. These catalysts are essentially non-pyrophoric and are exemplified by that sold under the trade designation Girdler Catalyst G–49A (Chemetron Corp.). The amount of catalyst utilized can vary, but will generally be in the range of from about 10 to about 40 parts of naphthalene or substituted naphthalene for each part by weight of catalyst employed. Reaction times for the hydrogenation are not especially critical, but will generally range from about 20 minutes to 2 hours, more preferably from 30 minutes to about an hour. It is an important feature of the aforementioned U.S. application 529,220 that the hydrogenation essentially ceases, or at least reduces substantially in rate, upon the attainment of tetralin nuclei.

Among the starting materials of the present invention are:

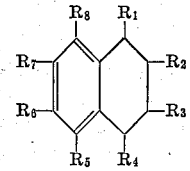

wherein 2 R groups are —COOH and the remaining R groups are H, wherein 2 R groups are —COOCH₃ and the remaining R groups are H, wherein 2 R groups are —COCl and the remaining R groups are H. Especially preferred are compounds in which the R groups are in the 2,6-positions.

Decahydronaphthalene dicarboxylic acids (DHN acids) may be prepared according to the method of J. Casares and J. Ranedo (Anales Soc. espan. fis. quin, 20, 519 (1922) using platinum catalyst, or by the method of W. J. Bailey and S. T. Quigley (J. Am. Chem. Soc., 81, 5598 (1959), using nickel-on-kieselguhr. Thus, for example, 2,6-dicarbomethoxynaphthalene is dissolved in a solvent, such as methanol or cyclohexane, and reacted with hydrogen at a temperature from about 0 to 200° C., preferably at about 105° C., under pressures from about 500 to about 10,000 p.s.i.a, preferably from about 1200 to 2000 p.s.i.a in the presence of a noble metal catalyst which may be admixed with carbon, for example, 10% palladium-on-carbon, 5% ruthenium-on-carbon, or 5% rhodium-on-carbon. The amount of catalyst to diester is not especially critical, but will probably be in the range of 100 to 1000 parts diester per part metal.

As mentioned previously, the polyamides of the present invention are produced by the reaction of diamines with the above mentioned THN acids, OHN acids, or their derivatives. The diamines may be either acyclic or cyclic, either aromatic or aliphatic. The amino groups are preferably located at opposite ends of the molecule or within 1 to 3 positions of opposite ends of the molecule. Especially preferred diamines are: hexamethylenediamine, piperazine, ethylene diamine, methylene dianiline, and phenylenediamine. The moel ratio of diamine to hydronaphthalene derivative is not narrowly critical, but is preferably about 0.5 to 1.0, more preferably 0.8 to 1.0, most preferably about 1:1.

The polymerization step of the present invention may be accomplished by various conventional techniques including bulk polymerization, interfacial polymerization, and solution polymerization. These will be mentioned briefly, but should be understood to be susceptible to the techniques generally employed in polymerization particularly in the preparation of conventional polyamides.

Bulk polymerization is accomplished by mixing the diacid, diester or diacid chloride and the diamine under a nitrogen blanket at temperatures sufficient to maintain the reaction mixture molten and sufficiently low to prevent decomposition (preferably from about 50 to about 400, more preferably from 100 to about 350, and most preferably from 200 to about 300) preferably at pressures of from about .001 p.s.i.a. to about 1,000 p.s.i.g., more preferably from about 0.001 p.s.i.a. to about 25 p.s.i.a., and most preferably from about 0.001 to about 15 p.s.i.a. Though not absolutely necessary, a catalyst may be employed if desired to enhance the reaction. Suitable catalyst are alkali metal hydroxides and alkaline earth metal hydroxides.

The resulting product polymer is separated from any excess diamine or any unreacted starting materials and conventionally extruded, cast, or molded.

The polymerization step of the present invention can be accomplished in the case of the acid chloride by the use of interfacial polymerization. This is a polycondensation of the diacid chloride with the diamine accomplished by dissolving the diacid chloride in a solvent, e.g., methylene chloride, chloroform, or carbon tetrachloride, or other suitable solvent which is inert under the conditions of the reaction, and thereafter contacting the resulting solution with an aqueous solution of the diamine. A catalyst such as sodium hydroxide or other soluble hydroxide may be used to aid in removing hydrogen chloride. Temperatures for this type of polymerization will generally be in the range of from about 5 to about 300° C., with temperatures of from about 20 to about 100° C. being more preferred, care being taken to maintain the reaction materials in a liquid state. In this type of reaction the solvents are chosen so as to be immiscible and the reaction occurs at the interface between the two solutions. The insoluble product is generally recovered by conventional filtration. Pressures in this type of polymerization are generally in the range of from about 0.01 to over 10,000 p.s.i.a, with pressures of from about 1 to about 100 p.s.i.a being most preferred.

Solution polymerization techniques are also adaptable to the diacid chlorides. Solution polymerization is accomplished by dissolving the diacid chloride and the diamine into a suitable solvent, e.g. methylene chloride, carbon tetrachloride, chloroform, and stirring in the presence of a polymerization catalyst, if desired, to remove by-product hydrogen chloride. Various catalysts may be employed, e.g., alkali metal hydroxides, alkaline earth metal hydroxides, alkali metal carbonates, alkaline earth metal carbonates, and pyridine. Among the products of the present invention are those containing the 1,2,3,4-tetrahydronaphthalene and/or decahydronaphthalene radicals connected to two groups of the type

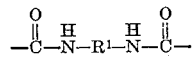

wherein R¹ is a carbon chain (acyclic or cyclic, either aromatic or aliphatic) containing from 2 to 40 carbon atoms.

The following examples will serve to further explain the invention, but all of the various modifications and variations which will be obvious to those skilled in the art upon a reading of the present specification should be included within the spirit of the claims appended hereto.

Example I.—To a 2-liter stirred reactor are added 600 parts of cyclohexane, 80 parts of 2,6-dicarbomethoxynaphthalene and 2 parts of a nickel-on-kieselguhr catalyst (Girdler Catalyst G–49A). After purging the air several times with hydrogen, the reactor is pressured to 1100 p.s.i.g. with hydrogen and the temperature of the reaction mixture is brought to 150° C. After 2 hours, hydrogen uptake stops and the mixture is removed from the reactor, filtered, and the solvent evaporated to give a 96% yield of 1,2,3,4-tetrahydro-2,6-dicarbomethoxynaphthalene having a melting point of 76–77° C.

Example II.—2,6 - dicarbomethoxynaphthalene (80 parts), cyclohexane (600 parts) and 5% rhodium-on-carbon (3 parts) were charged to a 2000 ml. stirred autoclave. After purging with hydrogen, the autoclave was pressured to 1500 p.s.i.g. with hydrogen and heated to 150° C. The uptake of hydrogen ceased after 6.5 hours. The reactor was depressurized, opened and the contents removed. Following filtration to remove catalyst and evaporation of the filtrate, a 97.1% yield of decahydro-2,6-dicarbomethoxynaphthalene was obtained boiling at 150–155° C./2–3 mm.

Example III.—A solution of 1,2,3,4-tetrahydronaphthalene-2,6-dicarbonyl chloride (7.7 parts) in methylene chloride (475 parts is added slowly at room temperature to a vigorously agitated solution of hexamethylenediamine (3.5 parts) in distilled water (2140 parts), containing 3.4 parts potassium hydroxide. The solid polyamide precipitates immediately and is separated by filtration, washed with hot water, and dried. It melts at 310° C., is soluble in concentrated sulfuric acid and m-cresol and can be molded at 310° C.

Example IV.—Dimethyl - 1,2,3,4-tetrahydro-2,6-naphthalene dicarboxylate (12.4 parts) and hexamethylene diamine (5.9 parts) are mixed together in a test tube. The mixture is heated over a four hour period from 120–260° C. under a nitrogen atmosphere until methanol ceases to distill. The resulting polymer had a melting point of 290° C.

Example V.—A solution of 21.8 parts decahydro-2,6-naphthalene dicarbonyl chloride in 500 parts methylene chloride is added to a rapidly stirred solution of 9.6 parts hexamethylene diamine and 9.3 parts potassium hydroxide in 2000 parts water. The polyamide precipitates immediately, is washed by decantation and dried. It had a melting range of 290–300° C. and was soluble in concentrated sulfuric and formic acids. It could be molded at 290–300° C., cast into films from m-cresol and extruded at 289° C.

What is claimed is:
1. A fiber-forming polyamide of (1) decahydronaphthalene dicarboxylic acid and (2) an organic diamine.
2. The polyamide of claim 1 wherein the organic diamine is piperazine.
3. The polyamide of claim 1 wherein the carboxy groups of the dicarboxylic acid are connected at the 2,6-positions.
4. The polyamide of claim 1 wherein the diamine is selected from the group consisting of ethylene diamine, methylene dianiline, and phenylene diamine.
5. The polyamide of claim 1 wherein the diamine is hexamethylene diamine and wherein the polyamide has a melting point above about 290° C.
6. A fiber-forming polyamide of (1) 1,2,3,4-tetrahydronaphthalene dicarboxylic acid wherein one carboxy group is directly attached to the saturated ring therein and the other carboxy group is directly attached to the aromatic ring therein, and (2) an organic diamine.
7. The polyamide of claim 6 wherein the organic diamine is piperazine.
8. The polyamide of claim 6 wherein the carboxy group of said 1,2,3,4-tetrahydronaphthalene dicarboxylic acid are connected at the 2,6-positions.
9. A fiber-forming polyamide melting above about 290° C. consisting essentially of the polymeric condensation product of (1) a 1,2,3,4-tetrahydronaphthalene dicarboxylic acid wherein one carboxy group is directly attached to the saturated ring therein and the other carboxy group is directly attached to the aromatic ring therein, and (2) a diamine selected from the group consisting of hexamethylene diamine, ethylene diamine, methylene dianiline, and phenylene diamine.
10. The polyamide of claim 9 wherein the dicarboxylic acid is a 2,6-dicarboxylic acid and wherein the mole ratio of diamines to dicarboxylic acid is from 0.5 to 1.0.
11. The polyamide of claim 10 wherein the diamine comprises hexamethylene diamine.

References Cited

UNITED STATES PATENTS

| | | | |
|---|---|---|---|
| 2,130,948 | 9/1938 | Carothers | 260—78 |
| 2,223,304 | 11/1940 | Lazier | 260—78 |
| 2,268,586 | 1/1942 | Gilman | 260—78 |
| 2,296,555 | 9/1942 | Hubert et al. | 260—78 |
| 2,937,162 | 5/1960 | Martin et al. | 260—78 |
| 2,972,602 | 2/1961 | Caldwell et al. | 260—78 |
| 3,070,562 | 12/1962 | Koller | 260—78 |
| 3,076,789 | 2/1963 | Mochel et al. | 260—78 |
| 3,145,219 | 8/1964 | Cripps | 260—78 |

HAROLD D. ANDERSON, Primary Examiner

U.S. Cl. X.R.

260—30.8, 31.2, 33.4